(12) United States Patent
Bono

(10) Patent No.: US 7,178,145 B2
(45) Date of Patent: Feb. 13, 2007

(54) QUEUES FOR SOFT AFFINITY CODE THREADS AND HARD AFFINITY CODE THREADS FOR ALLOCATION OF PROCESSORS TO EXECUTE THE THREADS IN A MULTI-PROCESSOR SYSTEM

(75) Inventor: Jean-Pierre Bono, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 1066 days.

(21) Appl. No.: 09/896,860

(22) Filed: Jun. 29, 2001

(65) Prior Publication Data

US 2003/0018691 A1    Jan. 23, 2003

(51) Int. Cl.
*G06F 9/46* (2006.01)

(52) U.S. Cl. ...................... 718/100; 718/102
(58) Field of Classification Search ......... 718/100–108
See application file for complete search history.

(56) References Cited

U.S. PATENT DOCUMENTS

| | | | |
|---|---|---|---|
| 4,604,694 A | 8/1986 | Hough | 364/200 |
| 5,437,032 A | 7/1995 | Wolf et al. | 395/650 |
| 5,826,081 A | 10/1998 | Zolnowsky | 395/673 |
| 5,892,915 A | 4/1999 | Duso et al. | 395/200.49 |
| 5,922,057 A | 7/1999 | Holt | 710/52 |
| 5,944,789 A | 8/1999 | Tzelnic et al. | 709/214 |
| 5,951,672 A | 9/1999 | Kwok et al. | 712/28 |
| 6,058,389 A * | 5/2000 | Chandra et al. | 707/1 |
| 6,192,408 B1 | 2/2001 | Vahalia et al. | 709/229 |
| 6,223,204 B1 | 4/2001 | Tucker | 709/103 |
| 6,269,390 B1 | 7/2001 | Boland | 709/100 |
| 6,289,369 B1 | 9/2001 | Sundaresan | 709/103 |
| 6,470,342 B1 * | 10/2002 | Gondi et al. | 707/10 |
| 6,769,017 B1 * | 7/2004 | Bhat et al. | 709/214 |
| 6,782,410 B1 * | 8/2004 | Bhagat et al. | 709/201 |

OTHER PUBLICATIONS

Jesse Liberty, "Sams Teach Yourself C++ in 21 Days—Third Edition," Sams Publishing, A Division of Macmillan Computer Publishing, Indianapolis, IN, 1999, pp. 127-147.

(Continued)

*Primary Examiner*—Meng-Al T. An
*Assistant Examiner*—Kenneth Tang
(74) *Attorney, Agent, or Firm*—Richard Auchterlonie; Novak Druce & Quigg, LLP

(57) ABSTRACT

In a multi-processor system, each processor has a respective hard affinity queue and soft affinity queue. For execution of a thread, a queue loader places an instance of the thread upon the hard or soft affinity queue of a selected processor. The selection may use an affinity attribute, processor attribute, accessor function, or a respective program of code threads for each processor. A thread instance on a processor's hard affinity queue is executed only by that processor. A thread instance on a processor's soft affinity queue is executed by that processor unless another processor has a soft affinity queue empty of thread instances ready for execution. Each processor alternates service priority between its hard and soft affinity queues. When a thread has a soft affinity it is initially bound to the processor it is started from. It will, then, be bound to the last processor it has been run on.

45 Claims, 11 Drawing Sheets

OTHER PUBLICATIONS

"*MultiProcessor Specification Version 1.4*," May 1997, Intel Corporation, Mt. Prospect, IL, 1993-1997, 1-1 to 5-8, A-1 to E-6.

"*Pentium® Processor Family Developer's Manual, vol. 3: Architecture and Programming Manual*," Intel Corporation, Mt. Prospect, IL, 1995, pp. 13-1 to 13-16, and 17-1 to 19-43.

Helen S. Raizen and Stephen C. Schwarm, "*Building a Semi-Loosely Coupled Multiprocessor System Based on Network Process Extension*," Prime Computer, Inc., Framingham, MA, Pre-Publication Copy, Jan. 29, 1991, pp. 1-17.

\* cited by examiner

QUEUES FOR SOFT AFFINITY CODE THREADS AND HARD AFFINITY CODE THREADS FOR ALLOCATION OF PROCESSORS TO EXECUTE THE THREADS IN A MULTI-PROCESSOR SYSTEM

BACKGROUND OF THE INVENTION

1. Field of the Invention

The present invention relates to the distribution of code thread instances to respective processors in a multi-processor digital computing system for execution of the code thread instances.

2. Description of the Related Art

With the advent of cache memory, there has been an advantage to coupling multiple processors to a shared memory for general-purpose applications. By providing a dedicated cache memory for each processor, each processor can operate at nearly 100% of the time by accessing cache memory most of the time and accessing the shared memory during a small percentage of the time. The shared memory can also be used for communication between the processors.

Since the introduction of the Intel PENTIUM (Trademark) microprocessor, the caches and memory management circuitry have been integrated onto commodity processor chips together with special machine instructions to facilitate the construction of multi-processor systems. See, for example, the Intel MultiProcessor Specification, Version 1.4, May 1997. More recently, the cost of these commodity processor chips has dropped relative to the cost of other computer system components so that general-purpose systems using commodity processors can be expanded at reasonable incremental cost by substituting multiple processor circuit boards where single processor circuit boards were previously used. However, the cost and delay of conversion of the software for the single processor circuit boards for efficient execution on the multiple processor circuit boards has hindered the substitution of the multiple processor circuit boards.

For some application software designed for multi-tasking systems, it is relatively easy to convert the software for the single processor circuit boards for execution on a multiple processor system. In such applications, the software is subdivided into code threads that are executed to perform independent tasks. In response to a user request to execute an application, a descriptor for a code thread for a task of the application is placed on a task queue. At any given time, the task queue may contain tasks for a multiplicity of applications. A task manager in the computer's operating system timeshares processor execution of the tasks on the task queue. The task manager may change the priorities of the tasks on the task queue, and execution of a task may be interrupted in order to execute a higher priority task. In order to resume an interrupted task, each task on the task queue has a respective execution context including the processor's register contents and local variable values at the time of interruption. Each task on the task queue also has a particular state, such as not yet executed, undergoing execution, or suspended for further execution. A task may be suspended for execution, for example, when the task is waiting for a call-back from an input-output device signaling completion of an input-output operation, or when the task is a repetitive task and waiting for its next time of performance.

For the execution of applications having independent tasks, it is relatively easy to execute the code threads on a multi-processor system. Each code thread can be executed on any of the processors, and when a processor is finished with a task, the processor can inspect the task queue to find and begin execution of the next task ready for execution. In general, however, there may be dependencies between the code threads of an application. The operating system or task manager itself may have code threads that have dependencies. Moreover, if each processor in the multi-processor system simply begins execution of the next task ready for execution, then some of the capabilities of a multiprocessor system cannot be realized, such as the parallel processing of a task by simultaneous execution on all of the processors. Further problems arise if certain hardware or software functions are dedicated to particular processors in the multiprocessor system.

Dependencies among code threads and between code threads and functions of particular processors in a multiprocessor system have been dealt with by additional overhead in the task manager. The task manager may provide capabilities for shared and exclusive task locking that attempts to avoid the so-called "spin locks" at the processor level. For tasks that are not conflicting, the task manager may assign a task to a selected one of the processors based on load balancing considerations. For example, the task manager may attempt to determine or monitor a desired or actual level of multi-tasking activity and assign each task to a processor for which each task has an affinity or at least neutrality in terms of relative execution speed. Unfortunately, task manager overhead has a significant impact on execution speed, and a supervisory system may produce results that the programmer might not anticipate. What is desired is a solution providing general applicability, minimal overhead, ease of implementation, and predictable results.

SUMMARY OF THE INVENTION

In accordance with one aspect, the invention provides a method of distributing and executing instances of code threads in a multi-processor system having a plurality of processors. The method includes assigning a respective one of the processors to each code thread instance, and assigning either a hard affinity or a soft affinity to the code thread instance so that the code thread instance is either a hard affinity code thread instance or a soft affinity code thread instance. The processor assigned to each hard affinity code thread instance executes the hard affinity code thread instance. The processor assigned to each soft affinity code thread instance executes the soft affinity code thread instance unless the soft affinity code thread instance is ready and waiting for execution when another processor has no assigned soft affinity code thread instance ready and waiting for execution and finds the soft affinity code thread instance ready and waiting for execution and executes it.

In accordance with another aspect, the invention provides a method of distributing and executing code thread instances in a multi-processor system having a plurality of processors. Each of the processors has a respective hard affinity queue and a respective soft affinity queue. The method includes placing each of the code thread instances on either the hard affinity queue or the soft affinity queue of a respective one of the processors. Each of the processors services its hard affinity queue so that each code thread instance having been placed on its hard affinity queue is not executed by any other processor. Moreover, each of the processors services its soft affinity queue and its soft affinity queue is also serviced by another one of the processors but at a lower priority than the other one of the processors services its own soft affinity queue.

In accordance with yet another aspect, the invention provides a multi-processor system comprising memory and a plurality of processors coupled to the memory for access to the memory. Each of the processors has a respective hard affinity queue and a respective soft affinity queue. The queues indicate code thread instances waiting for execution. Each of the processors is also programmed for servicing its hard affinity queue so that each code thread instance having been placed on its hard affinity queue is not executed by any other processor. Each of the processors is also programmed for servicing its soft affinity queue, which is also serviced by another one of the processors but at a lower priority than the other processor's own soft affinity queue.

In accordance with yet another aspect, the invention provides a multi-processor system having multiple processors and a shared memory coupled to the processors for access to the memory. The memory contains memory-resident code threads, a queue loader routine for queuing code thread instances, a queue service routine for dispatching code thread instances to the processors for execution, and a code thread manager program using the queue loader routine. Each of the processors has a respective hard affinity queue contained in the memory and a respective soft affinity queue contained in the memory. The queue loader routine is executable for loading each code thread instance onto a selected soft or hard affinity queue of a selected one of the processors. The queue service routine is executable by each processor for servicing its hard and soft affinity queues, and when its soft affinity queue is empty of code thread instances ready for execution, servicing the soft affinity queues of the other processors.

BRIEF DESCRIPTION OF THE DRAWINGS

Other objects and advantages of the invention will become apparent upon reading the following detailed description with reference to the drawings, in which.

Figure 1:
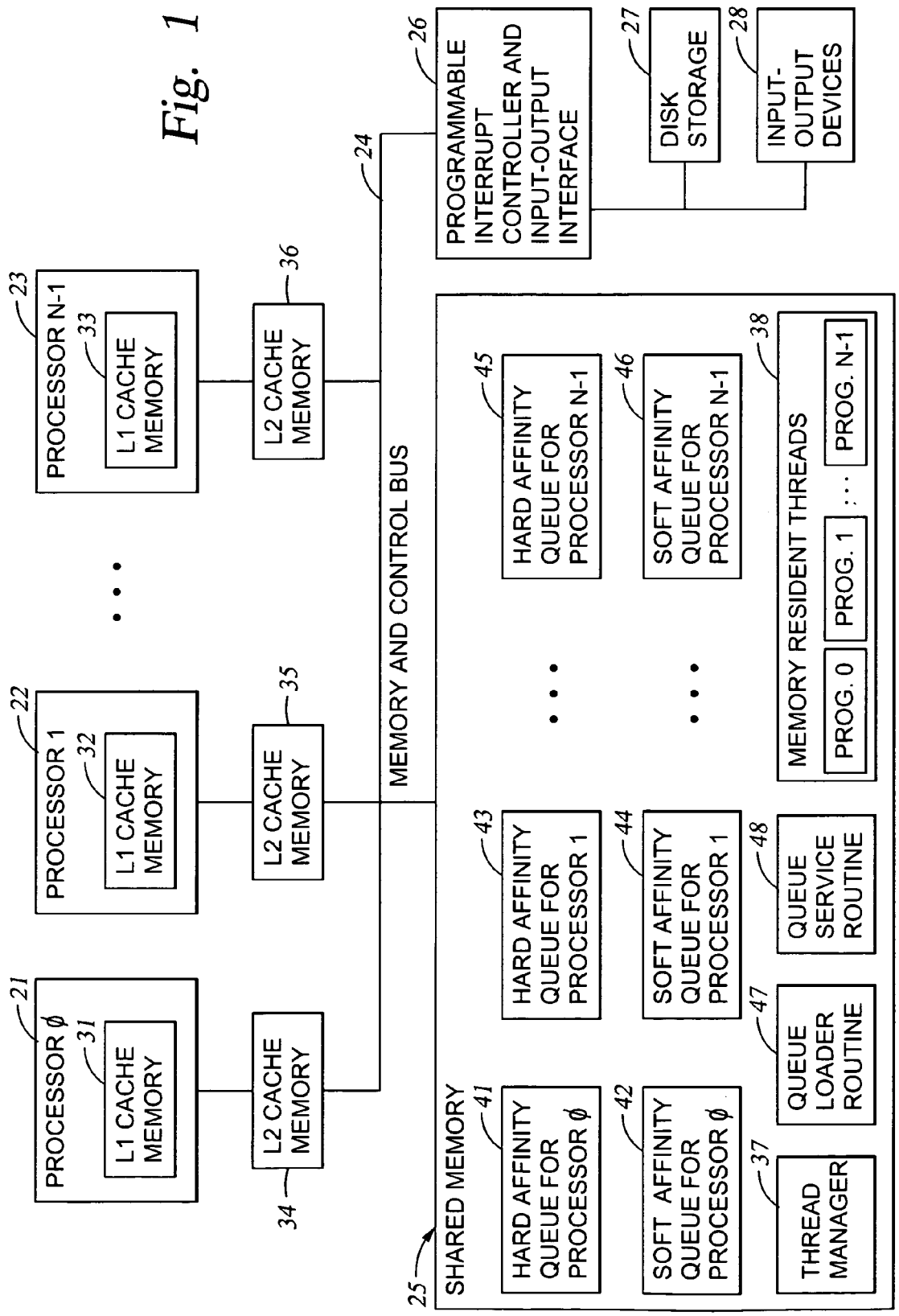
FIG. 1 is a block diagram of a multi-processor computing system including hard affinity and soft affinity queues in accordance with an aspect of the present invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1 of the drawings, there is shown a block diagram of a multi-processor system incorporating the present invention. The system includes multiple processors 21, 22, and 23, having respective processor numbers 0, 1, . . . , N−1, where N is the number of the processors. The processors 21, 22, 23, for example, are Intel PENTIUM (Trademark) processor chips. The processors 21, 22, and 23 share a memory and control bus 24 providing access of the processors to a shared memory 25 and a programmable interrupt controller and input-output interface 26. The programmable interrupt controller and input-output interface provides an interface to disk storage 27 and input-output devices 28 such as a keyboard, video display, network interface card, or floppy-disk drive. The programmable interrupt controller and the input-output interface 26 is a single integrated circuit chip such as an Intel 82489DX Advanced Programmable Interrupt Controller, although a programmable interrupt controller and the input-output interface could also be integrated on one or more of the processor chips.

If the system of FIG. 1 were to be compliant with the Intel MultiProcessor Specification, then the processor 21 having a processor number "0" would be called the "boot strap processor (BSP)", and the other processors 22, 23 would be called "application processors (AP)." Once all of the processors are up and running after a power-up or system reset, the processors may perform substantially the same functions or substantially different functions, depending on the program or programs that the processors are executing. They may perform different functions when it is desirable to have a single invocation of a program control a low-level function, such as a device driver for an input/output device that is to be shared among the processors. On the other hand, for fault tolerance and simplified failure recovery, it would be desirable for each processor to have its own dedicated I/O devices and device drivers. Due to these competing considerations, it is advantageous for some I/O devices such as a keyboard and a super VGA display to be shared among the processors, and others such as network and storage interfaces to be dedicated to respective processors.

By providing a dedicated cache memory for each processor, each processor can operate at nearly 100% of the time by accessing cache memory most of the time and accessing the shared memory during a small percentage of the time. For example, each of the processors 21, 22, 23 has a respective on-chip cache memory 31, 32, 33 called an L1 or "level 1" cache. The L1 cache memory is very fast but it has a relatively small memory capacity. Each of the processors 21, 22, 23 has a respective off-chip cache memory 34, 35, 36 called an L2 or "level 2" cache. The L2 cache is slower than the L1 cache, but it has a relatively large memory capacity. Each L2 cache also functions as an interface between the respective processor chip and the memory and control bus 24.

In a multi-tasking system, it is conventional for an application program to be subdivided into code threads for performing particular functions of the program. The operating system of the system includes a thread manager that shares processing time among a number of code thread instances that are maintained on a task queue. In the context of this patent application, a code thread refers to a segment of an executable program, and a code thread instance refers to not only the executable code but also a respective execution context including processor register state and local variables. The local variables, for example, are maintained on a call stack. It is conventional to place a code thread instance on a task queue by placing a code thread descriptor on the task queue. The code thread descriptor is in effect a pointer to a respective execution context, the executable code of the code thread, and in addition a respective execution priority and execution state for the code thread instance. The execution state, for example, indicates whether or not the code thread instance is running or idle, and whether or not an idle code thread is waiting on a certain condition.

The thread manager, for example, maintains the code thread instances on the task queue in priority order, by re-ordering or sorting the code thread descriptors whenever the execution priorities change. The task queue, for example, is organized as a doubly-linked list of code thread descriptors in order to facilitate the removal and replacement of a code thread descriptor when the execution priority of the code thread descriptor is changed. The code thread manager is responsive to a timer interrupt routine that periodically services the task queue and may suspend the execution of one code thread instance in favor of executing another code thread instance.

A multi-processor system typically has a similar thread manager that provides additional capabilities for concurrent execution of code thread instances on respective processors. A multi-processor thread manager typically provides capabilities for synchronization between code thread instances executing on different processors, in order to perform certain functions in parallel, to facilitate the use of the shared memory 25 for exchanging messages or sharing data among the processors, and to reduce the need for a processor to maintain an exclusive lock (the so-called "spin lock") upon the memory and control bus 24. In the multi-processor system of FIG. 1, the shared memory 25 includes a thread manager 37 managing instances of code threads 38 resident in the shared memory 25.

Due to the respective cache memory for each of the processors, it is desirable for certain related functions to be performed on the same processor, because the processing of a first function may have ensured that data for the second function will be resident in the cache at the start of processing for the second function. However, if the same function is performed on different data but a single cache cannot hold all of the data, then it is desirable for more than one of the processors to perform the same function upon respective partitions of the data.

In view of these considerations, and additional considerations discussed below, the present invention recognizes that it is desirable to associate "hard" and "soft" processor affinities to code thread instances. In the context of this patent application, a code thread is part of a program, and a code thread instance is a particular invocation or process of execution of the code thread. A code thread instance having a "hard" processor affinity is executed only by a specified one of the processors 21, 22, 23. A code thread instance having a "soft" processor affinity should be executed by a specified one of the processors unless the specified processor is heavily loaded and another processor is less heavily loaded and is available to process the code thread instance.

Due to the hard and soft affinities of the code thread instances to the respective processors, it is desirable to provide respective hard and soft affinity queues for each of the processors. As shown in FIG. 1, for example, the hard and soft affinity queues are contained in the shared memory 25. The number zero processor 21 has a hard affinity queue 41 and a soft affinity queue 42, the number one processor 22 has a hard affinity queue 43 and a soft affinity queue 44, and the number (N–1) processor 23 has a hard affinity queue 45 and a soft affinity queue 46. In the context of this patent application, a "queue" is simply a list of items waiting to be processed. The queue is typically serviced in a first-in, first-out basis, unless the items in the queue are assigned different priorities, in which case the items are processed in the order of their priorities. The hard affinity queue for each processor is a list of code thread instances having a hard affinity for the processor and waiting to be executed by the processor. The soft affinity queue for each processor is a list of code thread instances having a soft affinity for the processor and waiting to be executed by the processor.

A code thread instance on a hard affinity queue of a processor is executed only by that processor. A code thread instance in a soft affinity queue of a processor should be executed by that processor but another processor may execute the code thread instance and should execute the code thread instance if the other processor would otherwise be idle.

For loading code thread descriptors onto the hard and soft affinity queues, the shared memory contains a queue loader routine 47 that is called by the thread manager 37. The thread manager 37, for example, can be a conventional thread manager that has been modified to use the queue loader routine 47 instead of its own queue loader routine that would load code thread descriptors onto a single task queue. The thread manager 37, for example, is executed exclusively by the number zero processor 21 in response to a periodic timer interrupt. In response to each timer interrupt, the thread manager calls the queue loader 47 to load zero, one, or more code thread descriptors onto the hard affinity queues or soft affinity queues. Each time that the thread manager 37 calls the queue loader 47, the queue loader loads one code thread descriptor onto a selected one of the hard affinity queues or soft affinity queues.

Each of the processors 21, 22, 23 is responsible for servicing its respective hard affinity queue 41, 43, 45 and its respective soft affinity queue 42, 44, 46, and if its respective soft affinity queue is found to be empty during the time for servicing its respective soft affinity queue, then the processor will service the other soft affinity queues. Each of the processors 21, 22, 23 executes a queue service routine 48 in order to perform this queue servicing. Each of the processors executes the queue service routine 48 on a periodic basis in response to a timer interrupt, in order to select at most one code thread instance to execute each time that the processor executes the queue service routine.

Figure 2:
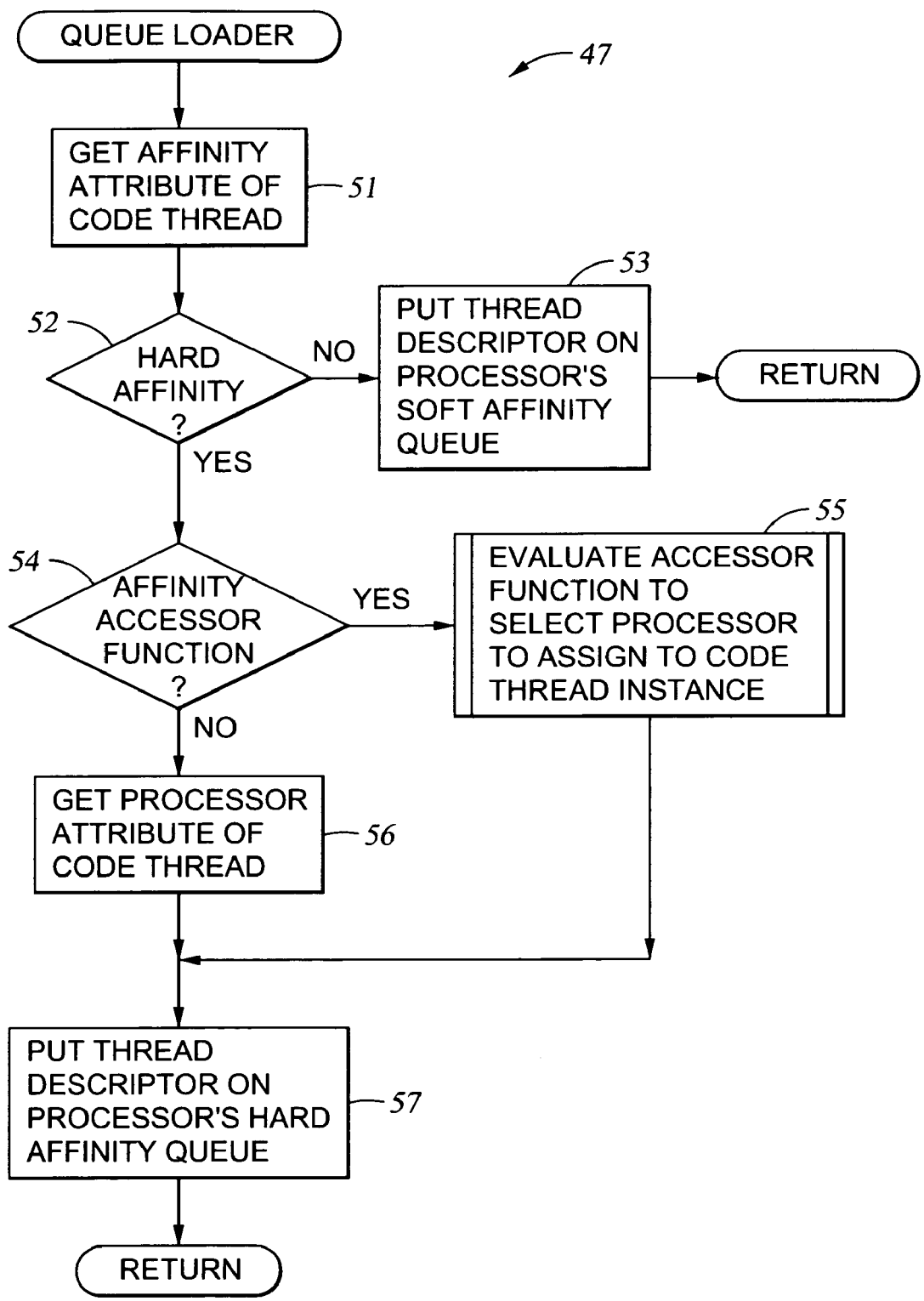
FIG. 2 is a flowchart for a queue loader routine introduced in FIG. 1.

With reference to FIG. 2, there is shown a flowchart of the queue loader routine 47. In a first step 51, the number zero processor obtains an affinity attribute of the code thread. The affinity attribute is coded by a programmer or compiler. The affinity attribute specifies an assigned processor and whether the code thread has a hard or soft affinity for the assigned processor. The affinity attribute may have a processor attribute specifying the assigned processor, or for a hard affinity, the affinity attribute may indicate an accessor function that can be evaluated to determine the assigned processor. The processor attribute, for example, is the number (0 to N−1) of the processor, and in a similar fashion invocation of the accessor function returns a processor number.

Execution continues from step 51 to step 52 in FIG. 2. Execution branches from step 52 to step 53 if the affinity attribute does not indicate a hard affinity. In step 53, the thread descriptor is placed on the processor's soft affinity queue, and execution returns.

If in step 52 the affinity attribute indicates a hard affinity, then execution continues to step 54. In step 54, if the affinity attribute indicates an affinity accessor function, then execution continues to step 55. In step 55, the affinity accessor function is evaluated to select a particular one of the processors to assign to the instance of the code thread. After step 55, execution continues to step 57 to put the thread descriptor on the processor's hard affinity queue, and execution returns.

In step 54, if the affinity attribute does not indicate an affinity accessor function, then the affinity attribute will contain a processor attribute of the code thread. Therefore, in step 56, the processor attribute of the code thread is obtained from the affinity attribute. After step 56, execution continues to step 57 to put the thread descriptor on the processor's hard affinity queue, and execution returns.

Figure 3:
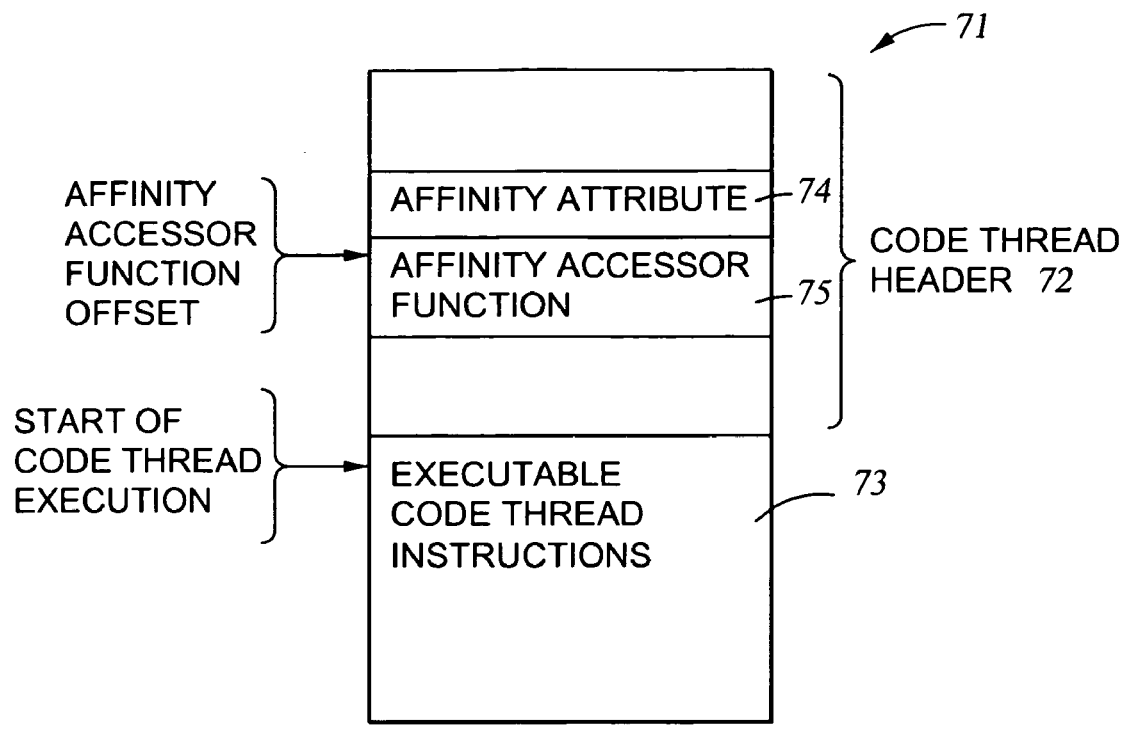
FIG. 3 is a block diagram of a code thread.

With reference to FIG. 3, there is shown a specific example of a code thread 71. The code thread includes a code thread header 72 having a predetermined number of bytes, followed by executable code thread instructions 73. The affinity attribute 74 is coded at a particular byte offset in the code thread header 72. If the affinity accessor function 75 is relatively small, which should be the typical case, it may follow the affinity attribute 74. Otherwise, the affinity accessor function 75 could be appended at the end of the executable code thread instructions or embedded in the executable code thread instructions. In any case, the starting byte address of the affinity accessor function is referred as the affinity accessor function offset. In general, the code thread could have various formats, and all that the programmer or compiler need do is place an affinity attribute at a selected location in the code thread, and encode the affinity accessor function offset into the affinity attribute.

Figure 4:
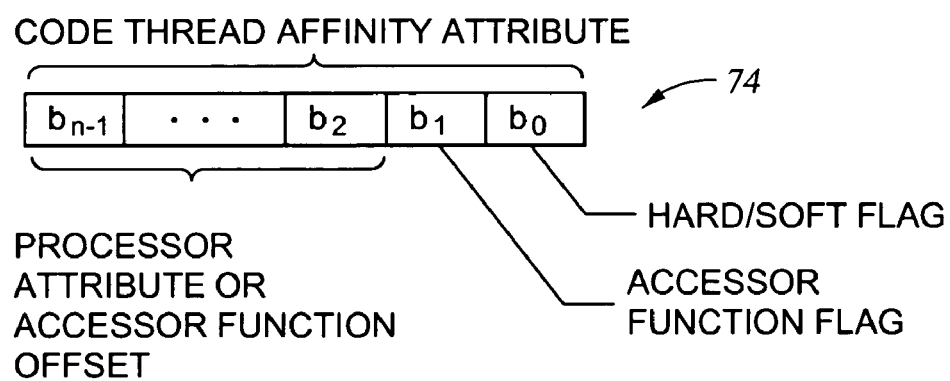
FIG. 4 shows an example of a way of encoding a code thread affinity attribute used in FIG. 2.

With reference to FIG. 4, there is shown a specific example for the code thread affinity attribute 74. The code thread affinity attribute is a word including bits $b_0$, $b_1$, $b_2$, ..., $b_{n-1}$. The least significant bit $b_0$ is a hard/soft flag indicating whether or not the code thread has a hard or soft affinity, the bit $b_1$ is an accessor function flag indicating whether or not a code thread having an affinity includes either a processor attribute or an accessor function offset, and bits $b_2$ to $b_{n-1}$ contain the processor attribute or the accessor function offset. The specific encoding for the code thread affinity attribute 74 shown in FIG. 4 permits the code thread affinity attribute to be decoded by a series of two logical right shifts resulting in either the processor attribute or the accessor function offset. The two logical right shifts set a carry bit for testing of the respective flags for steps 52 and 54 shown in FIG. 2.

Figure 5:
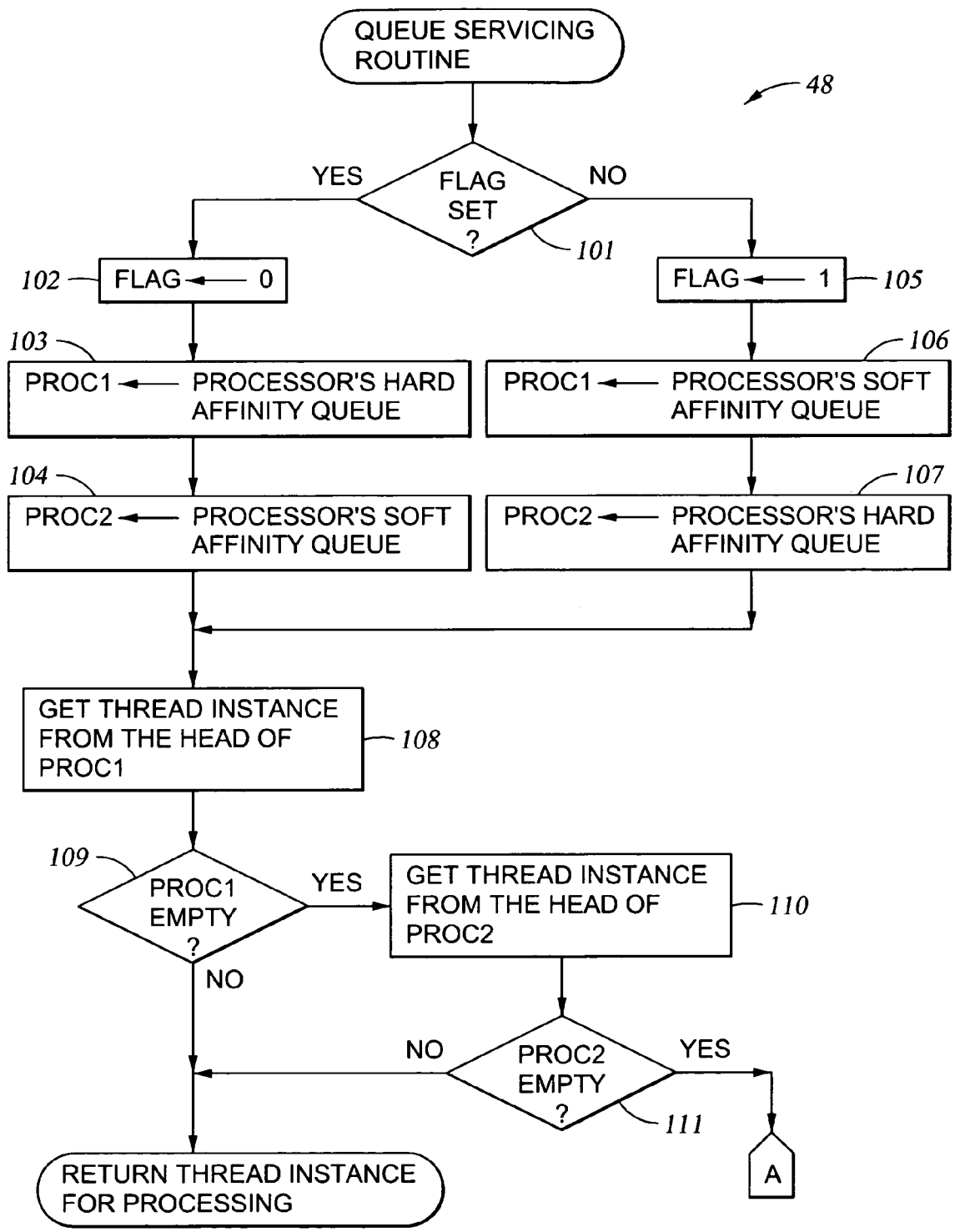
FIG. 5 is a first sheet of a flowchart of a queue servicing routine introduced in FIG. 1.

With reference to FIG. 5, there is shown a flowchart of the queue servicing routine generally designated 48. In a first step 101, the processor checks a local flag indicating whether, during this queue-servicing interval, the processor gives priority to servicing its hard affinity queue or the soft affinity queues. The flag is used to alternate service priority between the processor's hard affinity queue and the processor's soft affinity queue. In step 101, if the flag is set, then execution continues to step 102. In step 102, the flag is cleared. In step 103, a first priority pointer PROC1 is set to point to the processor's hard affinity queue, and in step 104, a second priority pointer PROC2 is set to point to the processor's soft affinity queue.

In step 101, if the flag not set, then execution branches to step 105. In step 105, the flag is set. In step 106, the first priority pointer PROC1 is set to point to the processor's soft affinity queue, and in step 107, a second priority pointer PROC2 is set to point to the processor's hard affinity queue. After steps 104 or 107, execution continues to step 108.

In step 108, a thread instance is obtained from the head of the first priority queue pointed to by PROC1. In step 109, if the first priority queue is not empty, then the queue servicing routine returns the thread instance for processing. In step 109, if the first priority queue is empty, then execution branches to step 110 to get the thread instance from the head of the second priority queue pointed to by PROC2. In step 111, if the second priority queue is not empty, then the queue servicing routine returns the thread instance for processing. In step 111, if the second priority queue is empty, then execution continues to step 112 in FIG. 6.

Figure 6:
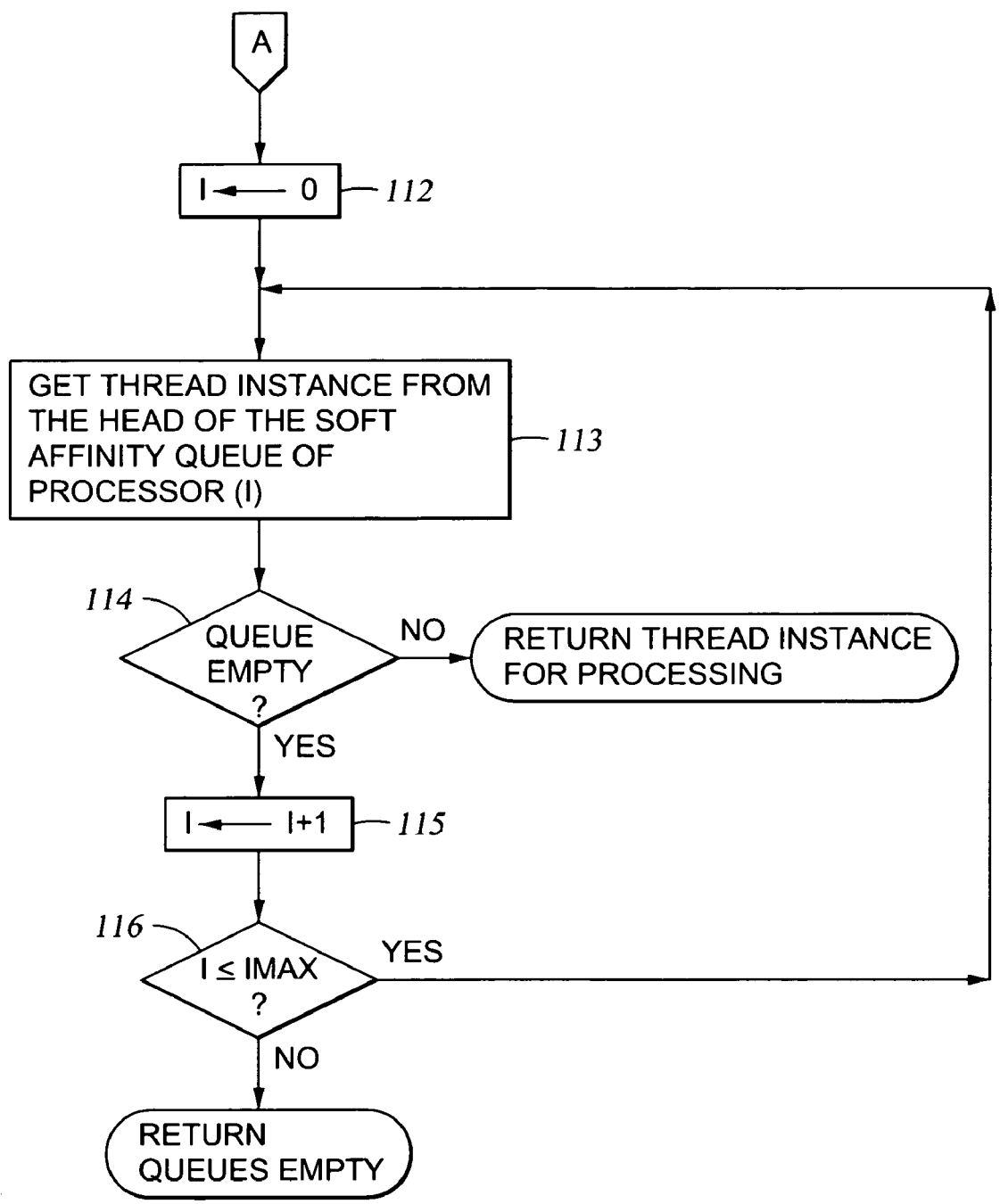
FIG. 6 is a second sheet of the flowchart begun in FIG. 5.

In FIG. 6, the soft affinity queues of the processors are scanned in sequence until a thread instance is found. In step 112, a processor index (I) is set to zero. In step 113, a thread instance is obtained from the head of the soft affinity queue of the processor indexed by the processor index (I). In step 114, if the queue is not empty, then the queue servicing routine returns the thread instance for processing. In step 114, if the queue is empty, execution continues to step 115 to increment the processor index (I). In step 116, if the processor index is less than or equal to a maximum index value IMAX (which is a constant set to one less than the number of processors), execution loops back from step 116 to step 113. Otherwise, if the index (I) is not less than or equal to the maximum index value IMAX, then execution returns reporting that the queues are empty.

Although FIG. 6 shows scanning the soft affinity queues in a numerical sequence beginning with processor number 0, it should be understood that the soft affinity queues of the other processors could be scanned in various ways. For example, the scanning of the soft affinity queues of the other processors could be done in a numerical sequence beginning with the next processor in a modulo-N numerical order following the processor executing the queue service routine and continuing in a modulo-N numerical order, where N is the number of processors in the multi-processor system.

Following is an example of C++ code corresponding to FIGS. 5 and 6:

```
inline Sthread* Sthread__removeFromRunQ(void)
{
Sthread* newT;
Sthread_Head *proc1, *proc2;
// deciding what proc's runq needs to be tested first
if (getSchedFairness( )) {
setSchedFairness(0);
proc1 = getProcHardRunq( ); // proc's hard affinity queue tested first
proc2 = getProcSoftRunq( );
}
else {
setSchedFairness(1);
proc1 = getProcSoftRunq( ); // proc's soft affinity queue tested first
proc2 = getProcHardRunq( );
}
if ((newT = proc1->remove__from__head( ))) {
return (newT);
}
```

-continued

```
if ((newT = proc2->remove_from_head( ))) {
return (newT);
}
#ifdef _DART_SMP_
// checking all the procs' soft affinity queues
int proc = 0;
do
{
if ((newT = Sthread_runq[proc].remove_from_head( ))) {
break;
}
} while (++proc <= lastCPUBooted);
#endif
return (newT);
}
```

Figure 7:
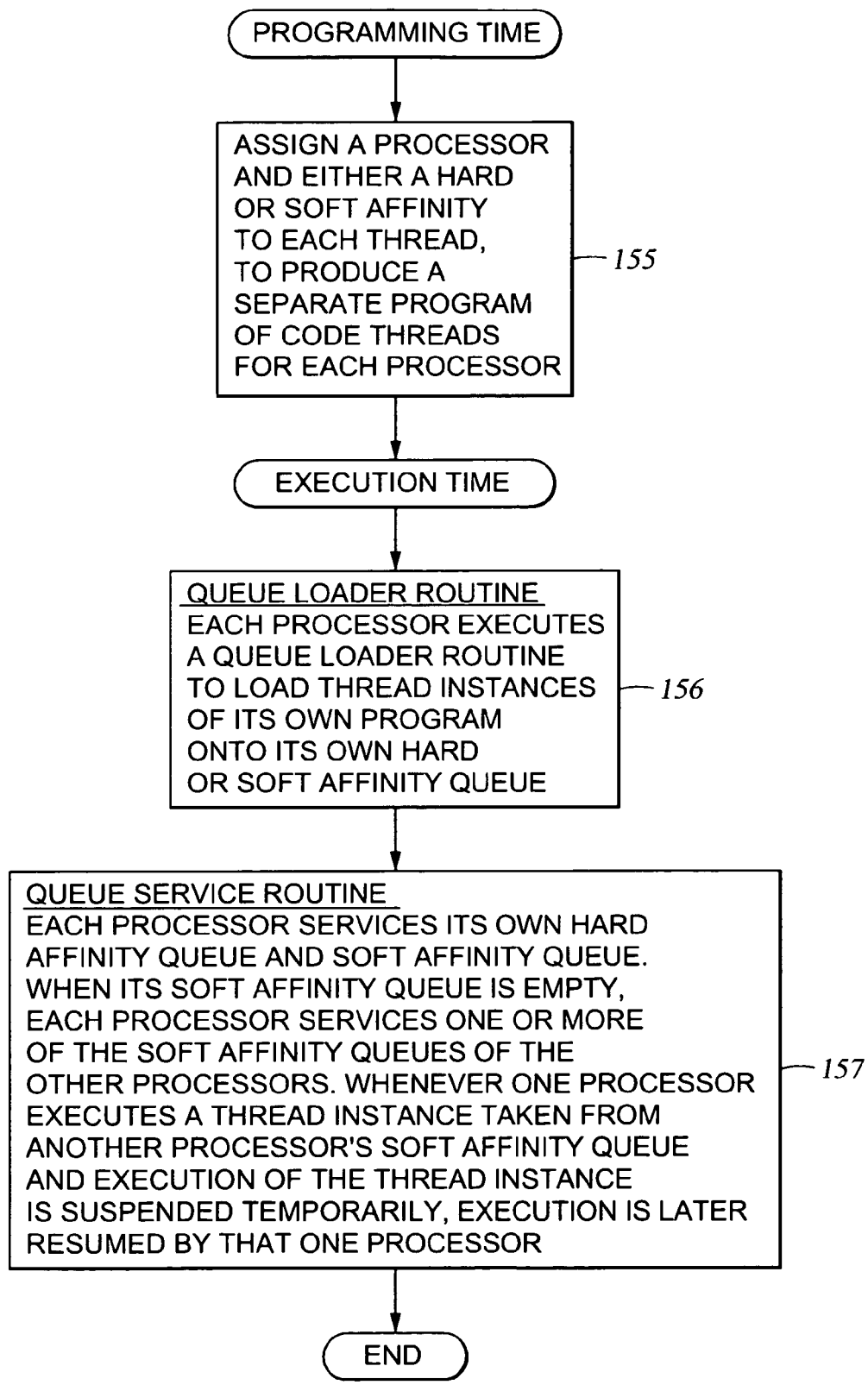
FIG. 7 is a flowchart of an implementation in which each processor has its own program including hard or soft code threads assigned to the processor.

FIG. 7 is a flowchart of an implementation in which each processor has its own program including hard or soft code threads assigned to the processor. (See also FIG. 1, showing the memory resident threads 38 including respective programs PROG. 1, PROG. 2, . . . , PROG. N–1.) This implementation eliminates the execution time required for decoding an affinity attribute and also distributes the queue loading function among all of the processors.

During programming time, in step 155, a processor and either a hard or soft affinity are assigned to each thread, to produce a separate program of code threads for each processor. Each code thread, for example, has a flag indicating whether or not the code thread has a hard or soft affinity.

During execution time, in step 156, each processor executes a queue loader routine to load thread instances of its own program onto its own hard or soft affinity queue. Also during execution time, in step 157, each processor services its own hard affinity queue and soft affinity queue. When its soft affinity queue is empty, each processor services one or more of the soft affinity queues of the other processors. Moreover, whenever one processor executes a thread instance taken from another processor's soft affinity queue and execution of the thread instance is suspended temporarily, execution is later resumed by that one processor. For example, when execution of the thread instance is suspended on a waiting condition or preempted in favor of a higher priority thread instance, the queue from which the thread instance was run is computed and memorized within the thread object. Therefore, if thread instance (A) had originally been placed on Proc0's soft affinity queue but was run by Proc1, it is now bound to Proc1, and any continued processing of the thread instance (A) is done by Proc1.

Following is a C++ code listing for an implementation in accordance with FIG. 7.

```
a) thread being created:
if(proc == -1) {
threadProcRunq = &Sthread_runq[processor( )];
threadAffinity = SOFT_AFFINITY;
}
else {
threadProcRunq = &Sthread_runq[proc+MP_MAX_NBR_CPUS];
threadAffinity = HARD_AFFINITY;
}
b) thread being suspended:
void
Sthread_Condition_unconstructed::wait(Sthread_MutexSpl_unconstructed* m)
{
Sthread_assert(getSplCount( ) == 1);
Sthread_assert(Sthread_isUnlockedRT( ));
Sthread_assert (m->assertLocked( ));
Sthread* oldT = Sthread_self( );
queueLock.lock( );
queue.insert_at_tail(&odT->runq);
oldT->threadProcRunq = oldT->getProcRunq( );
oldT->threadState = WAITING_CONDITION;
oldT->waitingCondition = this;
c) set of fcts/objects used to deal with affinity:
//
// return the processor's runq the thread belongs to depending
// on the thread's affinity.
Sthread_Head *getThreadProcRunq( ) { return threadProcRunq; }
Sthread_Head *getProcRunq( ) { return
((threadAffinity==SOFT_AFFINITY)?getProcSoftRunq( ):getProcHardRunq( )); }
//
// return the thread's processor affinity
Sthread_Affinity getAffinity( ) { return threadAffinity; }
//
// set the thread's processor affinity
// - proc = -1:SOFT_AFFINITY
// - proc within [0, lastCPUBooted]:HARD_AFFINITY on the specified processor
void setAffinity(int proc = -1);
static _inline_ Sthread_Head *getProcSoftRunq( )
{
register Sthread_Head *_value;
_asm_ _volatile_(
".byte 0x64\n\tmovl 0x28, %0"
:"=r" (_value)
);
```

```
return_value;
}
static_inline_Sthread_Head *getProcHardRunq( )
{
register Sthread_Head*_value;
_asm___volatile_(
".byte 0x64\n\tmovl 0x2c, %0"
:"=r" (_value)
);
return_value;
}
class Sthread_PerProcessorData_t {
/*
* the selector for the direct reference to this space
* it is loaded into the FS segment register
*/
int selector;
/*
* the logical number of the processor this area is for.
* the 0 processor is the boot processor and the rest are numbered
* sequenctially to an max of MP_MAX_NBR_CPUS-1
*/
int processor_number;
/*
* A per processor area current not used it's size is set in sysinit.s
*/
int * proc_area;
/*
* the current thread running on this processor
*/
Sthread *Current_Thread;
/*
* the idle thread for this processor
*/
Sthread *Idle_Thread;
cpu_state_t CPU_State;
friend cpu_state_t get_CPU_State(int cpuN);
friend boolean_t apBoot(void);
friend void cpuUsage(void);
public:
/*
* timer_hi and timer_lo used by get_ticks( )
*/
unsigned long timer_hi;
unsigned long timer_lo;
int splCount;
int schedFairness;
Sthread_Head *procSoftRunq; <== pointers computed at the boot time
Sthread_Head *procHardRunq;
};
```

Figure 8:
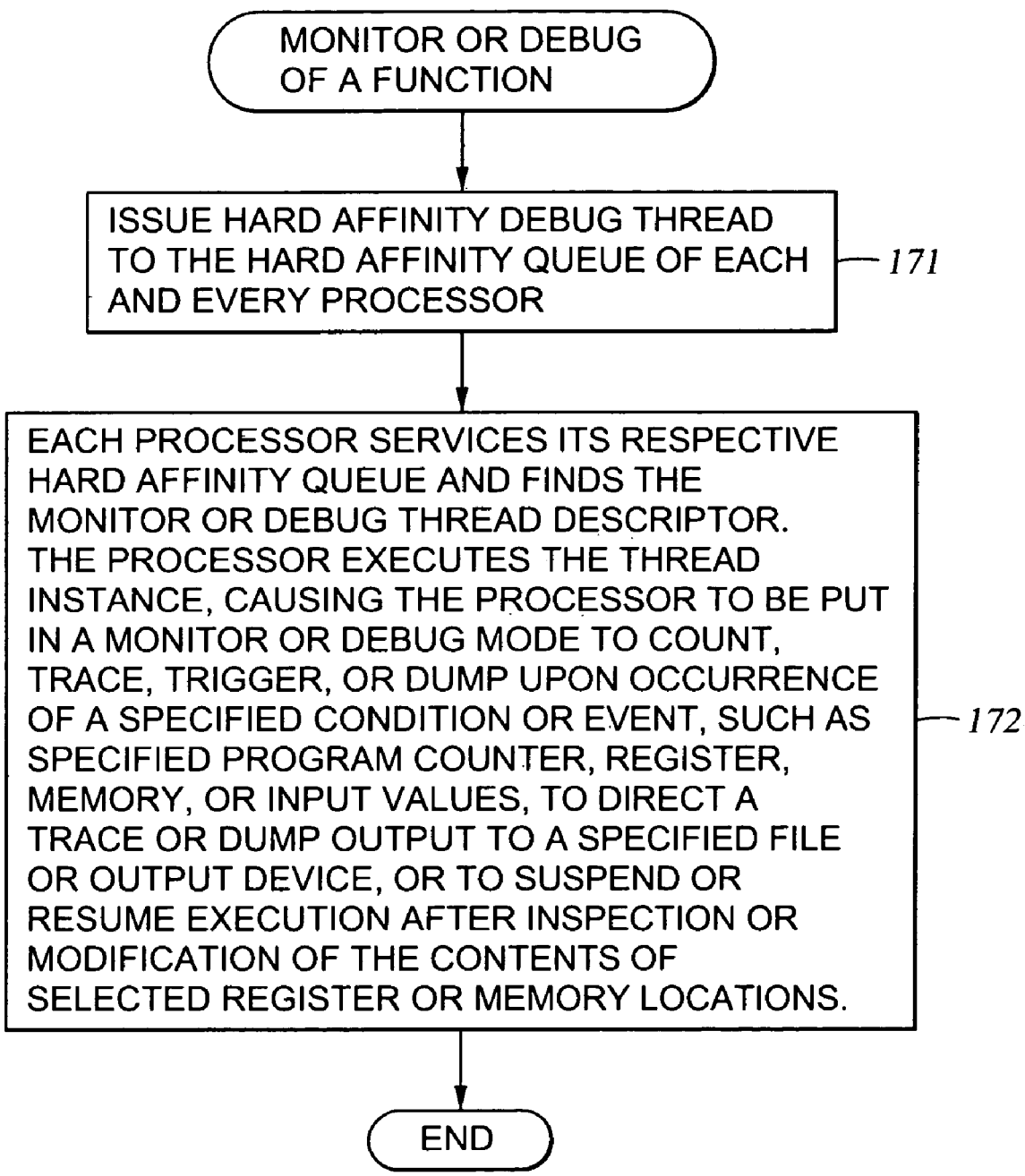
FIG. 8 is a flowchart of processing of a monitor or debug thread for monitoring or debugging a function by using the hard affinity queues of all of the processors.

Another example of the use of the hard affinity queue of a specified processor to cause the processor to perform a specified function is shown in FIG. 8. In this case, a monitor or debug thread is executed by each and every one of the processors in order to monitor or debug the processing performed by the processor. In a first step 171, the thread manager issues a monitor or debug thread to the hard affinity queue of each and every one of the processors. Then in step 172, each processor services its respective hard affinity queue and finds the monitor or debug thread descriptor. The processor executes the thread instance, causing the processor to be put in a monitor or debug mode to count, trace, trigger or dump upon occurrence of a specified condition or event, such as specified program counter, register, memory, or input values, to direct a trace or dump output to a specified file or output device, or to suspend or resume execution after inspection or modification of the contents of selected register or memory locations. Execution of the thread instance may direct a trace or dump output to a specified file or output device, or may suspend or resume execution of the processor after inspection or modification of the contents of selected registers or memory locations. For example, if a user wants to count how many times a function is called by using the debugging registers of the Pentium (™), the user needs to make sure that the setting will be applied to all the processors in the system because the code could become executed by any of the processors.

The PENTIUM (™), for example, has six registers and associated logic providing an automatic breakpoint capability for enhanced debugging and monitoring of program execution. There are four registers (dr0–dr3) used to specify a breakpoint address, one debugging control register (dr7) used to specify which type of access (execution, read or write) should be trapped, and one debugging status register (dr6). The registers dr0–dr3 and dr7 may be written to, and register dr6 is read-only. By default, the breakpoint feature is off. The breakpoint feature is turned on by writing the breakpoint address to dr0–dr3 and then enabling the breakpoint feature by writing a value different from zero to dr7. In particular, the bits of dr7 have the following functions:

Bit 1: enables dr0
Bit 3: enables dr1

Bit 5: enables dr2
Bit 7: enables dr3
Bits 16–17: R/W for dr0
Bits 18–19: LEN for dr0
Bits 20–21: R/W for dr1
Bits 22–23: LEN for dr1
Bits 24–25: R/W for dr2
Bits 26–27: LEN for dr2
Bits 28–29: R/W for dr3
Bits 30–31: LEN for dr3

The two-bit LEN field specifies a length of one byte (for LEN=00), two bytes (LEN=01), or four bytes (LEN=11). A length field of LEN=10 is undefined.

An example of a C++ code listing corresponding to FIG. 8 is as follows:

```
int proc=0;
while (mask && (proc <=lastCPUBooted)) {
Sthread::self( )->setAffinity(proc); // set hard affinity on proc
Sthread::yield( );
if (mask & (1<<DR0_SHIFT))
set_debuggingReg0(dr0);
if (mask & (1<<DR1_SHIFT))
set_debuggingReg1(dr1);
if (mask & (1<<DR2_SHIFT))
set debuggingReg2(dr2);
if (mask & (1<<DR3_SHIFT))
set_debuggingReg3(dr3);
if (mask & (1<<DR6_SHIFT))
set_debuggingReg6(dr6);
if (mask & (1<<DR7_SHIFT))
set_debuggingReg7(dr7);
logIO::logmsg(LOG_KERNEL,LOG_PRINTF,
"dbg register changes have been applied to PROC: % d\n",
   proc);
proc++;
}
Sthread::self( )->setAffinity( ); // restore soft affinity
```

Figure 9:
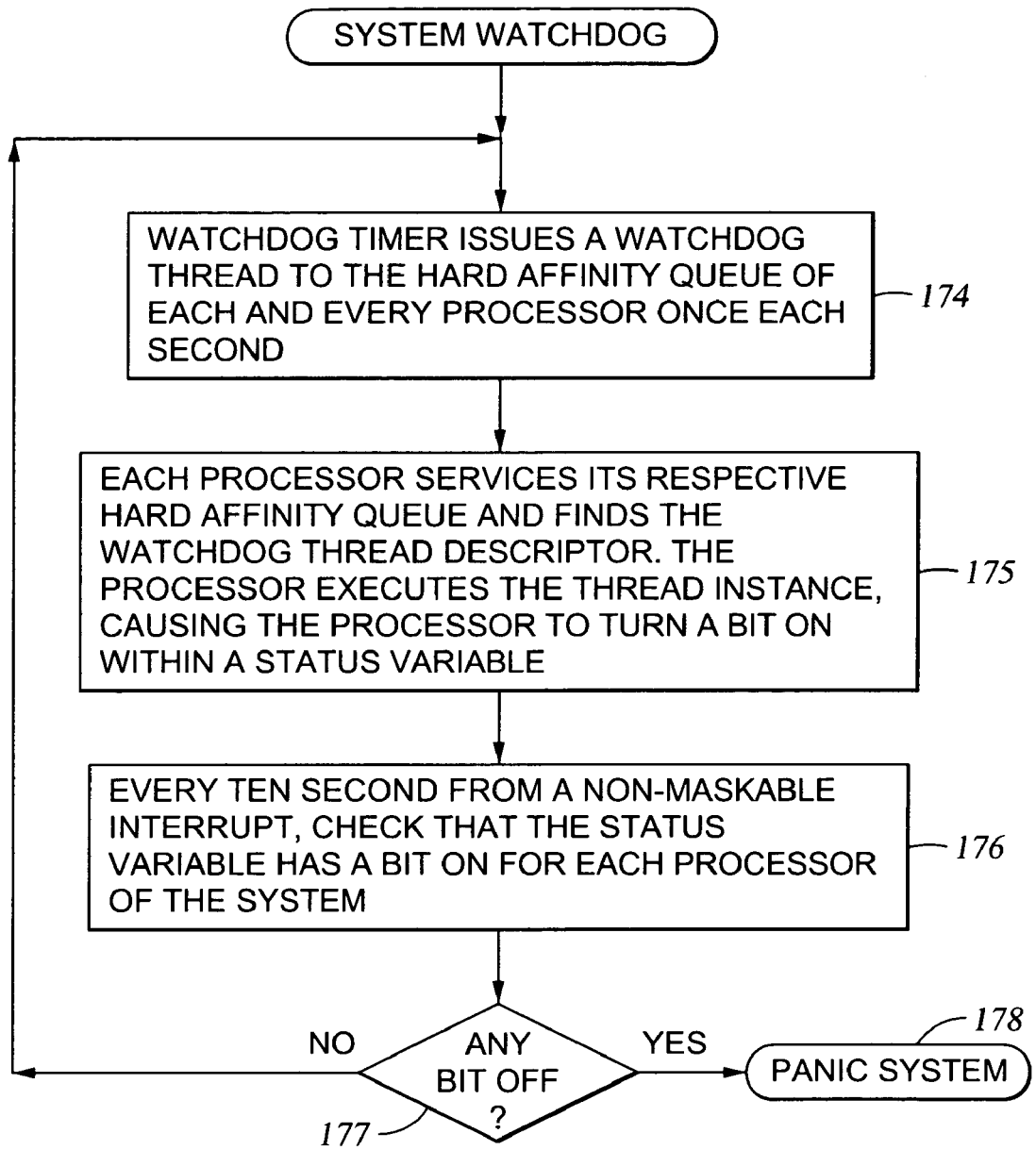
FIG. 9 is a flowchart of a system watchdog function.

FIG. 9 shows a flowchart of a system watchdog, which is another application of hard affinity code threads. In a first step 174, a watchdog timer issues a watchdog thread to the hard affinity queue of each and every processor once each second. Then in step 175, each processor services its respective hard affinity queue, and finds the watchdog thread descriptor. The processor executes the thread instance, causing the processor to turn a bit on within a status variable. In step 176, every ten seconds from a non-maskable interrupt, a check is made that the status variable has a bit on for each processor of the system. If any bit is off, then a failure or improper operation of at least one processor is indicated, and execution branches to step 178 to perform a panic system function, for example, shutting down and re-booting the system. If none of the bits are off, execution loops back to step 174 to repeat the process continuously while the system is running.

An example code listing corresponding to FIG. 9 is as follows:

```
void WatchDog_Initial::start(void)
{
int proc;
ThreadTimer_Periodic   watchdogTimer(watchdogThread
   Interval);
setSystemWatchDogTimer( );
do {
proc=0;
while ((proc<=lastCPUBooted)) {
wdog_thread->setAffinity(proc); // set hard affinity on proc
Sthread::yield( );
watchdog_cpu_state |=(1<<processor( );
proc++;
}
} while (system_watchdog_started && watchdogTimer.
   sleepUntil( ));
logIO::logmsg(LOG_KERNEL,LOG_PRINTF, "% s: is
   being shutdown\n",
Sthread::self( )->getName( ));
wdog_thread->detach( );
wdog_thread->suicide( );
}
extern "C" void turnSystemWatchDogOff( );
extern "C" void system_watchdog( )
{
// system state will not be tested if:
//-active kernel debugger session
//-active gdb session
//-active xdb session
//-needed number of ticks not reached yet
if (db_active || gdb_active || using_xdb) {
turnSystemWatchDogOff( );
return;
}
if    (++system_watchdog_ticks<watchdog_needed_ticks)
   return;
system_watchdog_ticks=0;
int proc=0;
while ((proc<=lastCPUBooted)) {
if (!(watchdog_cpu_state & (1<<proc))) {
system_watchdog_counter++;
if (system_watchdog_trigger)
panic("SYSTEM WATCHDOG");
}
proc++;
}
watchdog_cpu_state=0;
}
_t_nmi:
pushal # save all registers
cmpl $0, _CPUs_Stop # not NULL if panic being processed
jne 3f
cmpl $0, _system_watchdog_started
je 0f # no system watchdog if null
call_system_watchdog<==CALLED EVERY 10 seconds
```

Figure 10:
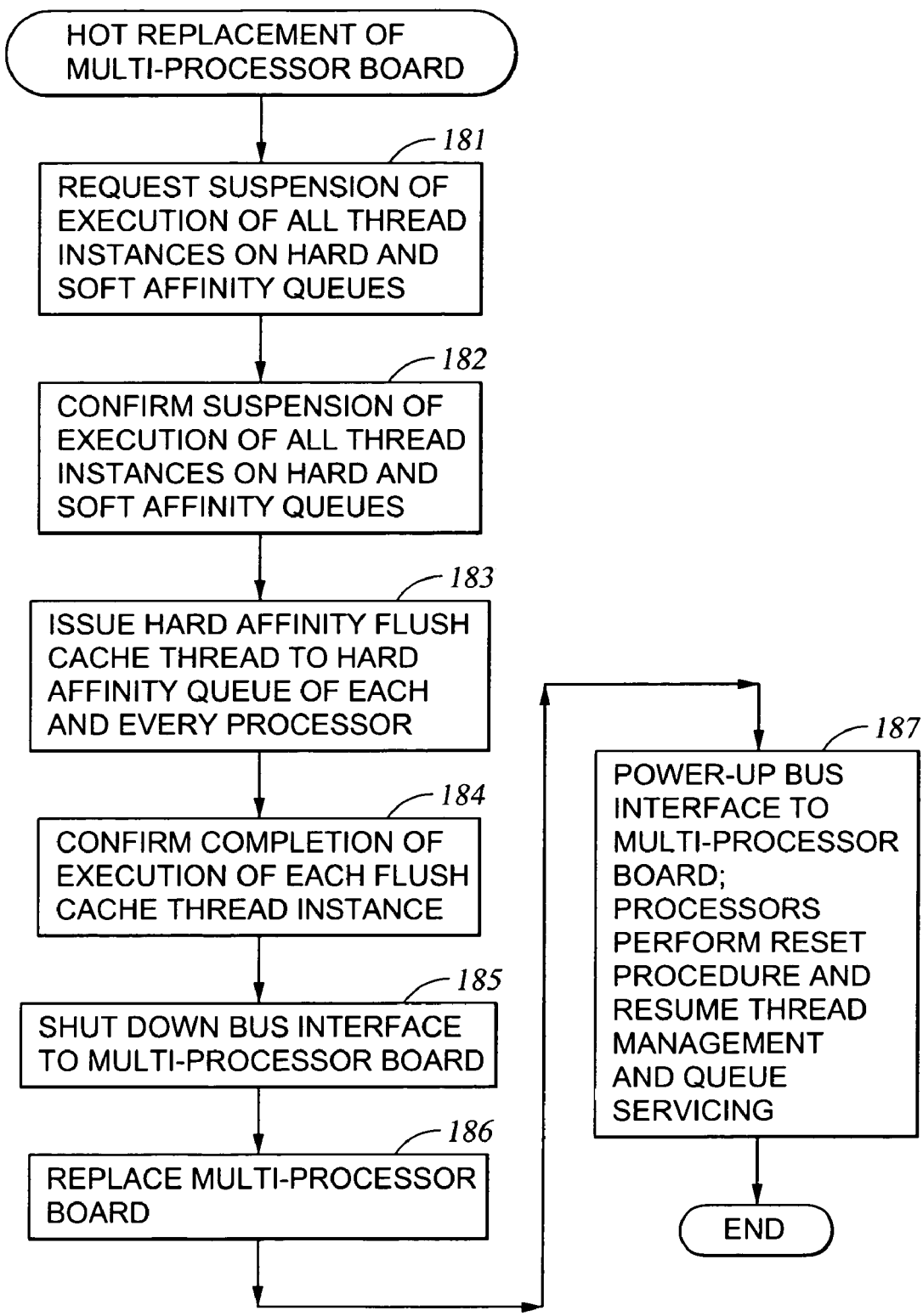
FIG. 10 is a flowchart of a program for hot replacement of a multi-processor circuit board by placing a flush cache thread instance on the hard affinity queue of each and every processor on the board prior to replacement of the board.

FIG. 10 shows another example of the use of hard code threads. For example, it is desirable for all of the processors to flush or write-back the contents of their local caches to the shared memory. In this example, the flush or write-back is done prior to the replacement of a circuit board containing the processors. In a first step 181, an operating system level routine requests suspension of execution of all of the thread instances on the hard and soft affinity queues. This can be done by setting the execution priority of all of the thread instances to a minimum value, so that the queues in effect become empty of code thread instances having sufficient priority to be executed at the next queue service time. Then in step 182, the operating system level routine confirms the suspension of execution of all of the code thread instances on the hard and soft affinity queues by inspecting the state of each of the code thread instances. Then in step 183, the operating system level routine issues a flush cache thread to the hard affinity queue of each of the processors. In step 184, the operating system level routine confirms completion of execution of each of the flush cache thread instances. Then in step 185, the bus interface to the multi-processor board is shut down so that removal of the processor board will not affect the state of the shared memory or the programmable interrupt controller and input/output interface. In step 186, an operator replaces the multi-processor board. Finally, in step 187, the operator powers-up the bus interface to the multi-processor board. This causes the processors to perform their reset procedure and resume thread management and queue servicing.

One application of the present invention is programming multi-processor boards that have been used to replace single-processor boards in a network file server. Shown in FIG. 11, for example, is a data processing system including a number of clients 191, 192 linked by a data network 193 to a network file server 194. The network file server 194 includes a number of client manager authentication and authorization of multi-processor boards 195, 196, a number of file system manager multi-processor boards 197, 198, and a cache disk storage system 199. Prior to replacement of the single processor boards with the multi-processor boards, the network file server 194 could have the construction shown in Tzelnic et al., U.S. Pat. No. 5,944,789 issued Aug. 31, 1999 entitled Network File Server Maintaining Local Caches Of File Directory Information In Data Mover Computers, incorporated herein by reference, and Duso et al., U.S. Pat. No. 5,892,915 issued Apr. 6, 1999 entitled System Having Client Sending Edit Commands to Server During Transmission of Continuous Media From One Clip in Play List for Editing the Play List, incorporated herein by reference.

Figure 11:
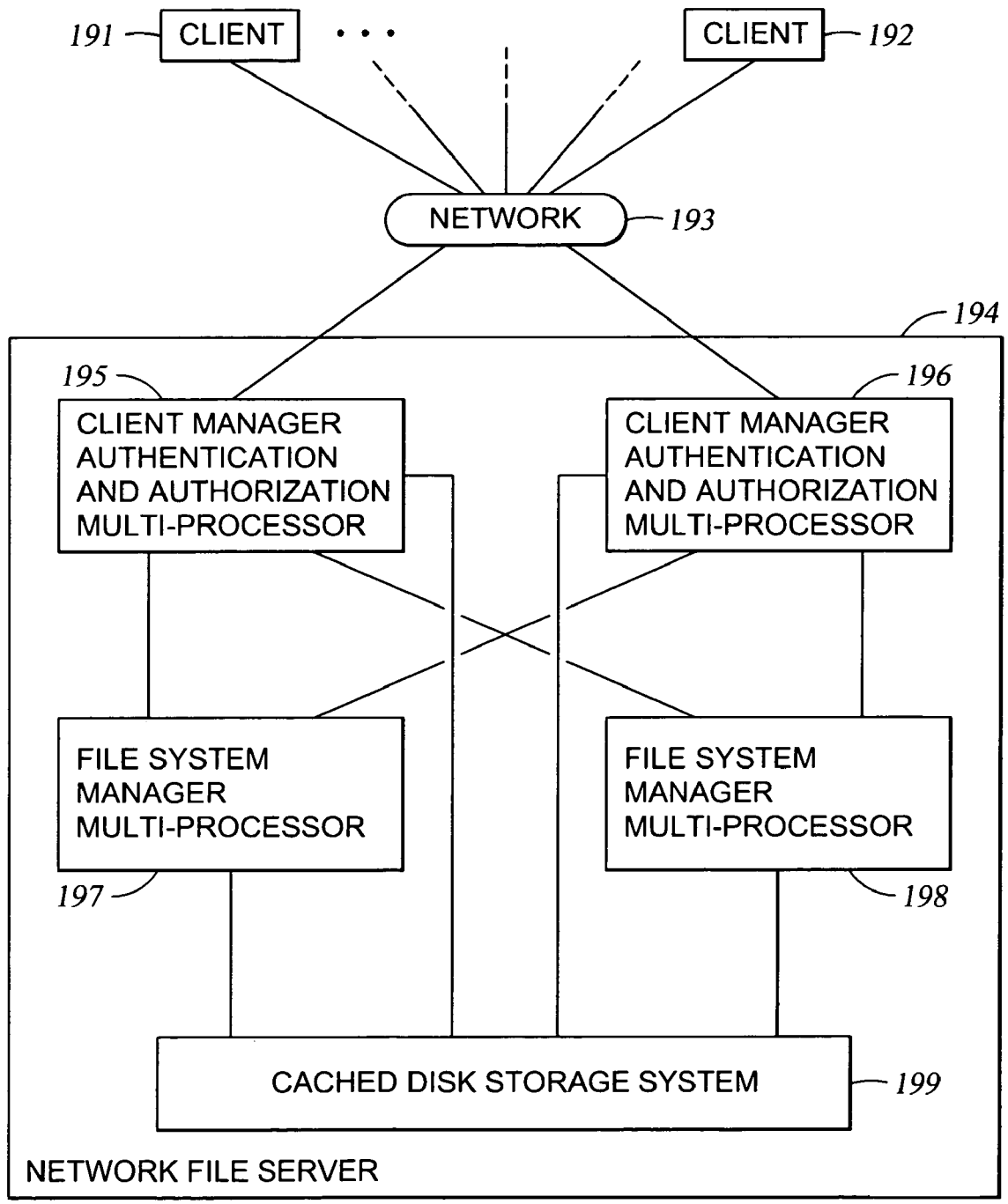
FIG. 11 is a block diagram of a network file server, including a number of multiprocessor systems for client manager and file system manager functions.

For the network file server 194 shown in FIG. 11, the client manager authentication and authorization multi-processor boards 195, 196 receive client requests from the network 193, and each client request is authenticated to verify that it is received from a known client, and then the request is checked to determine whether the known client is authorized to perform the requested file access. Once a client request has been authenticated and authorized, the request is passed to one of the file system manager multi-processor boards 197, 198. Each file system manager multi-processor board is responsible for managing access to particular file systems stored in the cached disk storage system 199. The file system manager multi-processor board converts the file system access requests to one or more requests for blocks of data at specified logical addresses in the cached disk storage system 199.

In order to most effectively use the level one and level two caches of the processors in the multi-processor boards, the client manager thread instances and the file system thread instances are assigned hard affinities and assigned respective processors so that each processor in a client manager authentication and authorization multi-processor board is associated with a particular group of clients, and each processor in a file system manager multi-processor board is associated with a particular group of file systems. In each case an affinity accessor function defines the respective group of clients or the respective group of file systems associated with each processor.

Figure 12:
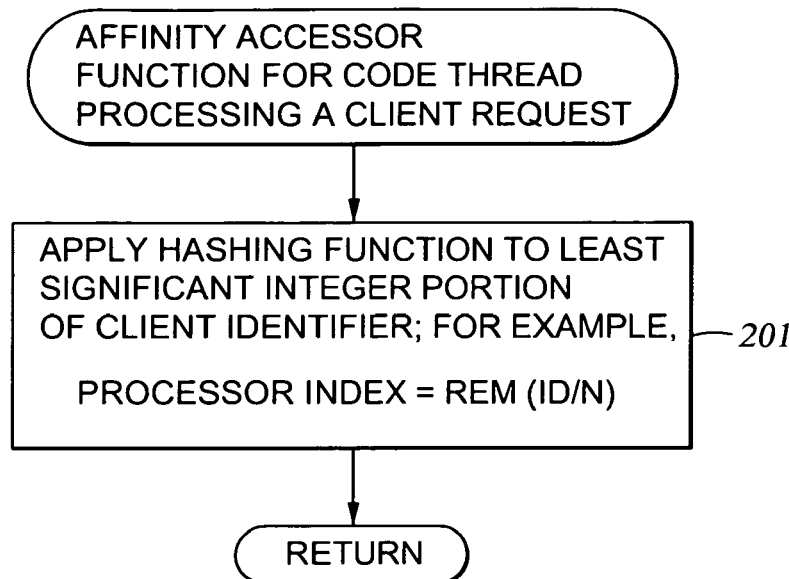
FIG. 12 is a flowchart of an affinity accessor function during the processing of a client request in the network file server of FIG. 11.

With reference to FIG. 12, there is shown a flowchart of an affinity accessor function for processing a client request. In step 201, the affinity accessor function applies a hashing function to the least significant integer portion of the client identifier in the client request. For example, the hashing function computes the index of the processor having the soft affinity by taking the remainder of an integer division of the least significant integer portion of a client identifier (ID) divided by the number (N) of processors that may process the client requests.

Figure 13:
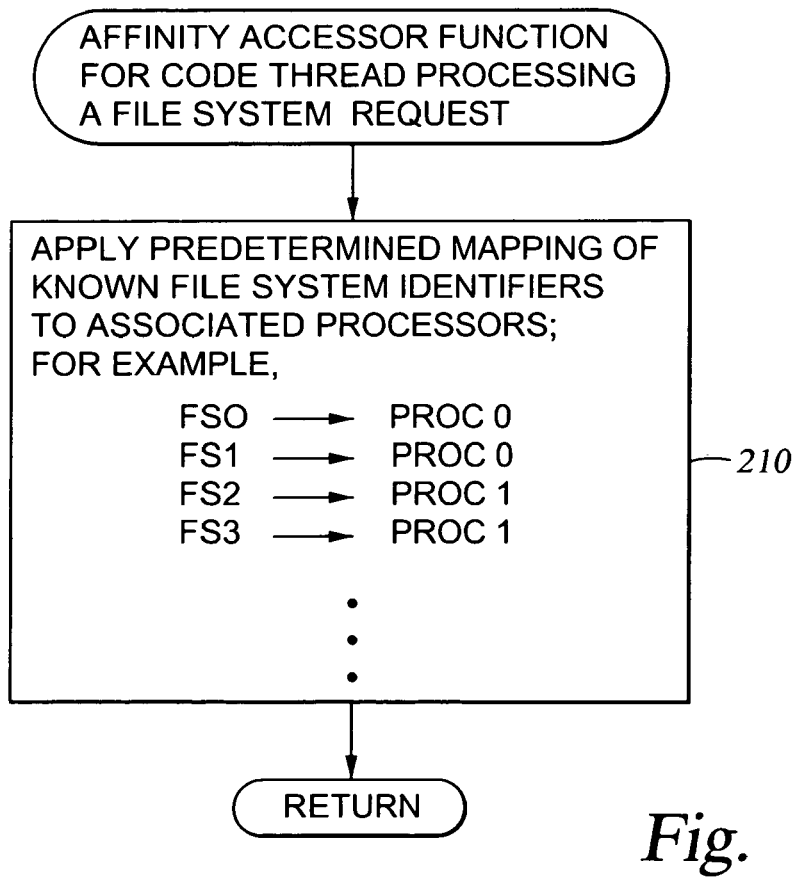
FIG. 13 is a flowchart of an affinity accessor function for file system access in the network file server of FIG. 11.

FIG. 13 shows a flowchart of an affinity accessor function for code threads that process a file system request. In this example, the particular file systems are predetermined so that it is possible to establish a predefined mapping between each file system and each processor in order to balance the loading of the file system requests upon the processors. Therefore, the affinity accessor function is evaluated by a look-up in a mapping table that maps file system identifiers to processor indices.

In view of the above, the provision of a respective hard affinity queue and a respective soft affinity queue for each processor in a multi-processor system provides a general solution to the problem of distributing code thread instances to the processors in such a way as to exploit the local caches of the processors for reduction of conflicting access to a shared memory during execution of the code thread instances. In a preferred implementation, a queue loader decodes a code thread attribute to determine a hard affinity or soft affinity. The queue loader selects the processor as indicated by a processor attribute, by evaluating a code thread accessor function, or by loading a processor's hard or soft affinity queues with instances of code threads from a respective program for the processor. Each processor services its own hard affinity queue and soft affinity queue, and if its soft affinity queue is empty of code thread instances ready for execution, it also services the soft affinity queues of the other processors. Each processor alternates service priority between its hard affinity queue and the soft affinity queues. When a thread instance has a soft affinity it is initially bound to the processor it is started from. It will, then, be bound to the last processor it has been run on.

What is claimed is:

1. A method of distributing and executing instances of code threads in a multi-processor system having a plurality of processors, said method comprising:

assigning a respective one of the processors to each code thread instance, and assigning either a hard affinity or a soft affinity to said each code thread instance so that said each code thread instance is either a hard affinity code thread instance or a soft affinity code thread instance;

the processor assigned to each hard affinity code thread instance executing said each hard affinity code thread instance; and the processor assigned to each soft affinity code thread instance executing said each soft affinity code thread instance unless said each soft affinity code thread instance is ready and waiting for execution when another processor has no assigned soft affinity code thread instance ready and waiting for execution and said another processor finds that said each soft affinity code thread instance is ready and waiting for execution so that said another processor executes said each soft affinity code thread instance.

2. The method as claimed in claim 1, wherein the assigning of either a hard affinity or a soft affinity to said each code thread instance includes decoding an affinity attribute of the code thread of said each code thread instance, the affinity attribute providing information regarding assignment of either a hard affinity or a soft affinity to said each code thread instance.

3. The method as claimed in claim 1, which includes assigning a plurality of code threads to at least one of the processors by including the plurality of code threads in a respective program for said at least one of the processors to execute.

4. The method as claimed in claim 3, which includes said at least one of the processors executing the respective program for said at least one of the processors to load instances of code threads of the respective program onto either a queue of hard affinity code thread instances for said at least one of the processors or a queue of soft affinity code thread instances for said at least one of the processors.

5. The method as claimed in claim 1, wherein at least one of the code threads contains a processor attribute identifying the respective one of the processors to be assigned to instances of said at least one of the code threads, and the method includes obtaining the processor attribute from said at least one of the code threads to assign the respective one of the processors to at least one instance of said at least one of the code threads.

6. The method as claimed in claim 1, wherein at least one of the code threads includes a function to be evaluated for determining the respective one of the processors to be assigned to instances of said at least one of the code threads, and the method further includes evaluating the function to determine the respective one of the processors to assign to at least one instance of said at least one of the code threads.

7. The method as claimed in claim 6, wherein the multi-processor system includes a number of the processors, the function is a hashing function, and the evaluation of the hashing function includes computing a remainder of an integer division by the number of the processors so that the remainder indicates the respective one of the processors to assign to said at least one instance of said at least one of the code threads.

8. The method as claimed in claim 1, which includes assigning a respective instance of a hard affinity monitor or debug code thread to each of the processors so that each of the processors executes the respective instance of the hard affinity monitor or debug code thread issued to each of the processors to monitor or debug a function executed by any of the processors.

9. The method as claimed in claim 1, which includes assigning a respective instance of a hard affinity watchdog code thread to each of the processors so that each of the processors executes the respective instance of the hard affinity watchdog code thread to detect improper operation of said each of the processors.

10. The method as claimed in claim 1, which includes issuing a respective instance of a hard affinity code thread to each of the processors so that each of the processors executes the respective instance of the hard affinity code thread issued to each of the processors.

11. The method as claimed in claim 1, which includes responding to a request of a client in a data processing network by assigning, to an instance of a client manager code thread, a processor selected by hashing at least a portion of a client identifier associated with the client request.

12. The method as claimed in claim 1, which includes responding to a file access request for access to a specified file system by assigning, to an instance of a file system manager code thread, a processor having been pre-assigned to process requests for access to the specified file system.

13. A method of distributing and executing code thread instances in a multi-processor system having a plurality of processors, each of the processors having a respective hard affinity queue and a respective soft affinity queue, said method comprising:
placing each of the code thread instances on either the hard affinity queue or the soft affinity queue of a respective one of the processors; and
each of the processors servicing the hard affinity queue of said each of the processors so that each code thread instance having been placed on the hard affinity queue of said each of the processors is not executed by any processor other than said each of the processors, said each of the processors servicing the soft affinity queue of said each of the processors and also another one of the processors servicing the soft affinity queue of said each of the processors but at a lower priority than said another one of the processors services the soft affinity queue of said another one of the processors.

14. The method as claimed in claim 13, wherein at least one of the processors services the soft affinity queue of said at least one of the processors by executing a next code thread instance on the soft affinity queue of said at least one of the processors when the soft affinity queue of said at least one of the processors is not empty of code thread instances ready for execution, and when the soft affinity queue of said at least one of the processors is empty of code thread instances ready for execution, servicing the soft affinity queue of at least one of the other processors.

15. The method as claimed in claim 14, wherein said at least one of the processors services the soft affinity queue of the other processors by inspecting the soft affinity queues of the other processors in a numerical sequence of the other processors until a soft affinity queue is found that is not empty of code thread instances ready for execution and a code thread is obtained from the soft affinity queue that is found to be not empty of code thread instances ready for execution or until all of the soft affinity queues of the other processors in the system are found to be empty of code thread instances ready for execution.

16. The method as claimed in claim 13, which includes decoding an affinity attribute of a code thread, the affinity attribute providing information regarding whether to place an instance of the code thread upon either a hard affinity queue or a soft affinity queue.

17. The method as claimed in claim 13, which includes producing a program of code threads for said each of the processors, and placing instances of the code threads of the program of code threads for said each of the processors on the hard affinity queue or soft affinity queue of said each of the processors.

18. The method as claimed in claim 13, wherein a code thread contains a processor attribute indicating the respective one of the processors having a hard or soft affinity queue upon which instances of the code thread should be placed, and the method includes obtaining the processor attribute from the code thread and placing at least one instance of the code thread on the hard or soft affinity queue of the respective one of the processors indicated by the affinity attribute obtained from the code thread.

19. The method as claimed in claim 13, wherein a code thread contains a function to be evaluated for determining the respective one the processors having an affinity queue upon which instances of the code thread should be placed, and the method includes evaluating the function to determine the respective one of the processors having an affinity queue upon which an instance of the code thread should be placed.

20. The method as claimed in claim 19, wherein the multi-processor system includes a number of the processors, the function is a hashing function, and the evaluation of the function includes computing a remainder of an integer division by the number of the processors to produce a remainder indicating the respective one of the processors having a hard or soft affinity queue upon which the instance of the code thread should be placed.

21. The method as claimed in claim 13, which includes assigning a respective instance of a hard affinity monitor or debug code thread to said each of the processors so that said each of the processors executes the respective instance of the hard affinity monitor or debug code thread issued to said each of the processors to monitor or debug a function executed by any of the processors.

22. The method as claimed in claim 13, which includes assigning a respective instance of a hard affinity watchdog code thread to said each of the processors so that said each of the processors executes the respective instance of the hard affinity watchdog code thread to detect improper operation of said each of the processors.

23. The method as claimed in claim 13, which includes placing a respective instance of a code thread upon the hard affinity queue of said each of the processors so that said each of the processors executes a respective instance of the code thread placed upon the hard affinity queue of said each of the processors.

24. The method as claimed in claim 13, which includes responding to a client request by hashing at least a portion of a client identifier associated with the client request in order to obtain an identification of one of the processors having a hard affinity queue onto which is placed an instance of a client manager code thread for processing the client request.

25. The method as claimed in claim 13, which includes responding to a request for access to a specified file system by placing an instance of a file system manager thread upon the hard affinity queue of one of the processors having been pre-assigned to process requests for access to the specified file system.

26. A multi-processor system comprising memory and a plurality of processors coupled to the memory for access to the memory, each of the processors having a respective hard affinity queue and a respective soft affinity queue, the queues indicating code thread instances waiting for execution, said each of the processors being programmed for servicing the hard affinity queue of said each of the processors so that each code thread instance having been placed on the hard affinity queue of said each of the processors is not executed by any processor other than said each of the processors, said each of the processors being programmed for servicing the soft affinity queue of said each of the processors and also another one of the processors being programmed for servicing the soft affinity queue of said each of the processors at a lower priority than the soft affinity queue of said another one of the processors.

27. The multi-processor system as claimed in claim 26, wherein at least one of the processors is programmed to periodically interrupt execution of a current code thread instance by said at least one of the processors to determine whether or not execution of the current code thread instance should be suspended to execute another code thread instance having higher execution priority than the current code thread instance, and wherein said at least one of the processors alternates service priority between servicing the hard affinity queue of said at least one of the processors and servicing the soft affinity queue of said at least one of the processors.

28. The multi-processor system as claimed in claim 26, wherein at least one of the processors is programmed for servicing the soft affinity queue of said at least one of the processors by executing a next code thread instance on the soft affinity queue of said at least one of the processors when the soft affinity queue of said at least one of the processors is not empty of code thread instances ready for execution, and when the soft affinity queue of said at least one of the processors is empty of code thread instances ready for execution, servicing the soft affinity queue of at least one of the other processors.

29. The multi-processor system as claimed in claim 28, wherein said at least one of the processors is programmed for servicing the soft affinity queue of the other processors by inspecting the soft affinity queues of the other processors in a numerical sequence of the other processors until a soft affinity queue is found that is not empty of code thread instances ready for execution and a code thread is obtained from the soft affinity queue that is found to be not empty of code thread instances ready for execution or until all of the soft affinity queues of the other processors in the system are found to be empty of code thread instances ready for execution.

30. The multi-processor system as claimed in claim 26, wherein at least one of the processors is programmed for placing code thread instances on the hard and soft affinity queues by decoding an affinity attribute of a code thread, the affinity attribute providing information regarding whether to place an instance of the code thread upon either a hard affinity queue or a soft affinity queue.

31. The multi-processor system as claimed in claim 26, which includes a respective program for said each of the processors, the respective program containing hard and soft affinity code threads assigned to said each of the processors.

32. The multi-processor system as claimed in claim 26, wherein a code thread contains a processor attribute indicating the respective one of the processors having a hard or soft affinity queue upon which instances of the code thread should be placed, and at least one of the processors is programmed for obtaining the processor attribute from the code thread and placing at least one instance of the code thread on the hard or soft affinity queue of the respective one of the processors indicated by the affinity attribute obtained from the code thread.

33. The multi-processor system as claimed in claim 26, wherein a code thread contains a function to be evaluated for determining the respective one the processors having a hard or soft affinity queue upon which instances of the code thread should be placed, and at least one of the processors is programmed for evaluating the function to determine the respective one of the processors having a hard or soft affinity queue upon which an instance of the code thread should be placed.

34. The multi-processor system as claimed in claim 33, wherein the multi-processor system includes a number of the processors, the function is a hashing function, and the evaluation of the function includes computing a remainder of an integer division by the number of the processors to produce a remainder indicating the respective one of the processors having a hard or soft affinity queue upon which the instance of the code thread should be placed.

35. The multi-processor system as claimed in claim 26, wherein at least one of the processors is programmed for placing a monitor or debug code thread instance on the hard affinity queue of each of the processors to monitor or debug a function executed by any of the processors.

36. The multi-processor system as claimed in claim 26, wherein at least one of the processors is programmed for placing a hard affinity watchdog code thread instance on the hard affinity queue of said each of the processors so that said each of the processors executes the respective instance of the hard affinity watchdog code thread to detect improper operation of any of the processors.

37. The multi-processor system as claimed in claim 26, wherein at least one of the processors is programmed for placing a respective instance of a code thread upon the hard affinity queue of said each of the processors so that said each of the processors executes a respective instance of the code thread placed upon the hard affinity queue of said each of the processors.

38. The multi-processor system as claimed in claim 26, wherein the multi-processor system is part of a network server, and at least one of the processors is programmed for responding to a client request by hashing at least a portion of a client identifier associated with the client request in order to obtain an identification of one of the processors having a hard affinity queue onto which is placed an instance of a client manager code thread for processing the client request.

39. The multi-processor system as claimed in claim 26, wherein the multi-processor system is part of a file server, and at least one of the processors is programmed for responding to a request for access to a specified file system by placing an instance of a file system manager code thread upon the hard affinity queue of one of the processors having been pre-assigned to process requests for access to the specified file system.

40. A multi-processor system having multiple processors and a shared memory coupled to the processors for access to the shared memory, the shared memory containing memory-resident code threads, a queue loader routine for queuing code thread instances, a queue service routine for dispatching code thread instances to the processors for execution, and a code thread manager program using the queue loader routine, wherein the multi-processor system further comprises:
   each of the processors having a respective hard affinity queue contained in the shared memory and a respective soft affinity queue contained in the shared memory;
   the queue loader routine being executable for loading each code thread instance onto a selected soft or hard affinity queue of a selected one of the processors;
   the queue service routine being executable by each of the processors for servicing the hard and soft affinity queues of said each of the processors and for servicing the soft affinity queues of the other processors when the soft affinity queue of said each of the processors is empty of code thread instances ready for execution; and
   wherein the queue service routine is executable for servicing the soft affinity queues of the processors by executing a next code thread instance on the soft affinity queue of the processor executing the queue service routine when the soft affinity queue of said at least one of the processors is not empty of code thread instances ready for execution, and when the soft affinity queue of the processor executing the queue service routine is empty of code thread instances ready for execution, servicing the soft affinity queues of the other processors.

41. The multi-processor system as claimed in claim 40, wherein the queue service routine is executable for servicing the soft affinity queues of the other processors by inspecting the soft affinity queues of the other processors in a numerical sequence of the other processors until a soft affinity queue is found that is not empty of code thread instances ready for execution and a code thread is obtained from the soft affinity queue that is found to be not empty of code thread instances ready for execution or until all of the soft affinity queues of the other processors are found to be empty of code thread instances ready for execution.

42. The multi-processor system as claimed in claim 40, wherein a code thread contains a function to be evaluated for determining a respective one the processors having a hard or soft affinity queue upon which instances of the code thread should be placed, and the queue loader routine is executable for evaluating the function to determine the respective one of the processors having a hard or soft affinity queue upon which an instance of the code thread should be placed.

43. The multi-processor system as claimed in claim 42, wherein the multi-processor system includes a number of the processors, the function is a hashing function, and the evaluation of the function includes computing a remainder of an integer division by the number of the processors to produce a remainder indicating the respective one of the processors having a hard or soft affinity queue upon which the instance of the code thread should be placed.

44. The multi-processor system as claimed in claim 40, wherein the queue loading routine is executable for decoding an affinity attribute of a code thread, the affinity attribute providing information regarding whether to place an instance of the code thread upon either a hard affinity queue or a soft affinity queue.

45. The multi-processor system as claimed in claim 40, wherein a code thread contains a processor attribute indicating a respective one of the processors having a hard or soft affinity queue upon which instances of the code thread should be placed, and the queue loader routine is executable for obtaining the processor attribute from the code thread and placing at least one instance of the code thread on the hard or soft affinity queue of the respective one of the processors indicated by the affinity attribute obtained from the code thread.

* * * * *